(12) United States Patent
Matsuda et al.

(10) Patent No.: US 8,755,752 B2
(45) Date of Patent: Jun. 17, 2014

(54) RADIO WAVE PROPAGATION CHARACTERISTIC ESTIMATION SYSTEM, RADIO WAVE PROPAGATION CHARACTERISTIC ESTIMATION METHOD, AND RADIO WAVE PROPAGATION CHARACTERISTIC ESTIMATION PROGRAM

(75) Inventors: Yuma Matsuda, Tokyo (JP); Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 499 days.

(21) Appl. No.: 13/145,843

(22) PCT Filed: Jan. 28, 2010

(86) PCT No.: PCT/JP2010/051075
§ 371 (c)(1),
(2), (4) Date: Jul. 22, 2011

(87) PCT Pub. No.: WO2010/090115
PCT Pub. Date: Aug. 12, 2010

(65) Prior Publication Data
US 2011/0281526 A1    Nov. 17, 2011

(30) Foreign Application Priority Data
Feb. 3, 2009  (JP) .................................. 2009-022838

(51) Int. Cl.
*H04B 17/00* (2006.01)
(52) U.S. Cl.
USPC ...................................................... 455/67.11
(58) Field of Classification Search
USPC ..................................... 455/67.7, 67.11, 466
See application file for complete search history.

(56) References Cited

U.S. PATENT DOCUMENTS

| | | | |
|---|---|---|---|
| 8,244,511 B2 * | 8/2012 | Yonezawa et al. | 703/13 |
| 2007/0271079 A1 * | 11/2007 | Oguchi et al. | 703/8 |
| 2010/0267343 A1 * | 10/2010 | Nyu | 455/67.7 |
| 2011/0281526 A1 * | 11/2011 | Matsuda et al. | 455/67.11 |
| 2013/0115961 A1 * | 5/2013 | Shibayama et al. | 455/446 |

FOREIGN PATENT DOCUMENTS

| | | |
|---|---|---|
| JP | 09-153867 A | 6/1997 |
| JP | 3092651 A | 9/2000 |
| JP | 2003-318811 A | 11/2003 |
| JP | 2005-192145 A | 7/2005 |
| JP | 2007-306701 A | 11/2007 |
| JP | 2008-270875 A | 11/2008 |

* cited by examiner

*Primary Examiner* — April G Gonzales
(74) *Attorney, Agent, or Firm* — Sughrue Mion, PLLC

(57) ABSTRACT

Disclosed are a radio wave propagation characteristic estimation system, radio wave propagation characteristic estimation method, and radio wave propagation characteristic estimation program for estimating propagation characteristics of radio waves at high speeds, without deteriorating accuracy. An object selection module reads map data prerecorded on a map data memory unit and selects structures from the structures indicated in structure data included in the map data according to the height thereof, a radio wave propagation path calculation module searches for the path of radio waves emitted from a transmission point based on the structure data related to the selected structures and location data for the transmission point and an observation point, and calculates the propagation path of the radio waves until the radio waves reach the observation point, and a radio wave propagation characteristic estimation module estimates the propagation characteristics of radio waves at the observation point based on this calculated path.

19 Claims, 9 Drawing Sheets

FIG.4

| RADIO BASE STATION IDENTIFIER | RADIO CELL IDENTIFIER | LONGITUDE | LATITUDE | ALTITUDE | FREQUENCY | TRANSMISSION POWER CAPACITANCE | ANTENNA HEIGHT | ANTENNA PATTERN | ANTENNA AZIMUTH ANGLE | ANTENNA TILT ANGLE |
|---|---|---|---|---|---|---|---|---|---|---|
| 10 | 1 | X1 | Y1 | Z1 | F1 | P1 | H1 | A1 | B1 | C1 |
| 10 | 2 | X2 | Y2 | Z2 | F2 | P2 | H2 | A2 | B2 | C2 |
| 10 | 3 | X3 | Y3 | Z3 | F3 | P3 | H3 | A3 | B3 | C3 |
| ... | ... | ... | ... | ... | ... | ... | ... | ... | ... | ... | ized. Japanese Patent Application No. 2009-
RADIO WAVE PROPAGATION CHARACTERISTIC ESTIMATION SYSTEM, RADIO WAVE PROPAGATION CHARACTERISTIC ESTIMATION METHOD, AND RADIO WAVE PROPAGATION CHARACTERISTIC ESTIMATION PROGRAM

CROSS REFERENCE TO RELATED APPLICATIONS

This application is a National Stage of International Application No. PCT/JP2010/051075 filed Jan. 28, 2010, claiming priority based on Japanese Patent Application No. 2009-022838 filed Feb. 3, 2009, the contents of all of which are incorporated herein by reference in their entirety.

TECHNICAL FIELD

The present invention relates to a radio wave propagation characteristic estimation system, a radio wave propagation characteristic estimation method, and a radio wave propagation characteristic estimation program for estimating the propagation characteristic of radio waves emitted from a transmission point and reaching an observation point.

BACKGROUND ART

As a technique for supporting layout and the like of base stations when building a radio communication system, a radio wave propagation characteristic estimation system (a radio wave propagation simulator) is known. This radio wave propagation simulator is a system which sets location data of a transmission point that is a point from which a radio wave is emitted and location data of a reception point that is a point at which the radio wave is received, and calculates a radio wave state at the reception point. By evaluating received power and delay expansion at an arbitrary reception point calculated by this system, the base station set place, parameters, or the like can be determined. This makes it possible to efficiently secure the areal communicable area, to reduce the number of base stations to be located, etc.

Known radio wave propagation simulators can be roughly classified into those using a statistic method and those using a deterministic method. The statistic method is a method which gives a propagation loss estimation formula using a distance, frequency, and the like as arguments, and uses a multivariate analysis and the like based on a great amount of data acquired by actual measurements of propagation loss when determining the parameters.

A radio wave propagates while being reflected, transmitting, and diffracted at undulations and structures such as buildings (referred to as objects hereinafter). However, the statistic method estimates only the attenuation amount of radio waves according to the distance from the base station, direction, and the frequency of the transmission radio wave regardless of objects in the surroundings of the reception point. Thus, it is not possible to estimate the local radio wave propagation environment highly accurately.

In the meantime, the deterministic method is a method which estimates the radio wave propagation based on influences imposed upon the radio wave caused by the objects. As one of such deterministic methods, there is a ray tracing method. The ray tracing method is a method which considers radio waves emitted from an antenna of a radio wave dispatching source as a group of a great number of radio wave rays, traces each ray as a wave that propagates geometrical-optic manner while repeating reflection and transmission, and acquires the loss and delay amount of the radio waves at an observation point by synthesizing a great number of rays arriving at the observation point. The ray tracing method estimates the radio wave propagation by adding the influences of reflection, transmission, and diffraction at the objects, so that it is possible to perform highly accurate estimation of the radio wave propagation.

Particularly, when an upper-floor of a high-rise building is set as an observation point, it is likely to have issues of deterioration in the radio wave quality due to interference and failures in handover because an unobstructed view from the surroundings can be secured so that radio waves from a great number of base stations located at distant places can reach thereto. In order to investigate proper measures by grasping the radio wave conditions inside such building without making a great effort, the radio wave propagation simulation is effective. Under an environment such as an upper-floor of a high-rise building, it is effective to use the ray tracing method which takes the reflection and diffraction of the radio waves at the surrounding objects into consideration.

However, with the deterministic method, an arithmetic calculation processing amount becomes increased since the reflection points and the diffraction points of the radio waves are increased when there are a great number of objects within an analysis target area. Specifically, the arithmetic calculation processing amount is increased roughly in proportional to a square of the number of objects. As a result, a great amount of time is required for the radio wave propagation estimation.

In order to overcome such issues, Patent Documents 1 and 2 disclose techniques which speed up the arithmetic calculation processing of the radio wave propagation estimation with the ray tracing method.

Patent Document 1 discloses a technique which limits the path of the rays by searching the paths of the roads from a transmission point to a reception point and intersection points under a street micro cell environment where base stations are located at locations lower than surrounding buildings, and performs estimation of the radio wave propagation condition by excluding objects located at locations distant from the searched paths. Under the street micro cell environment, there is only a small influence on the accuracy of the radio wave propagation estimation even if the buildings distant from the areas along the roads are ignored since the radio waves mostly propagate along the roads. Thus, it is possible with the technique disclosed in Patent Document 1 to speed up the arithmetic calculation processing without largely deteriorating the accuracy.

Patent Document 2 discloses a technique which refers to data of buildings within a specified area based on the distance from a transmission point and a reception point, and traces the track of the radio waves propagated from the transmission point to the reception point. It is possible with Patent Document 2 to estimate the radio wave propagation characteristic from the transmission point to the reception point at a high speed without deteriorating the accuracy.

Patent Document 1: Japanese Patent No. 3092651
Patent Document 2: Japanese Unexamined Patent Publication 2003-318811

DISCLOSURE OF THE INVENTION

Problems to be Solved by the Invention

However, as described above, radio waves from base stations at distant places also arrive at upper-floors of high-rise buildings. Thus, with the techniques disclosed in Patent Documents 1 and 2, it is necessary to expand the simulation target area compared to a case where a reception point is on the ground level, when the upper-floor of high-rise building is set as a reception point. The number of objects is increased in accordance with expansion of the target area. As a result, the arithmetic calculation processing amount increases, the time required for the radio wave propagation estimation becomes extended, and the load on the system is becomes increased as well.

Specifically, for grasping the radio wave condition arriving from a single base station on a ground level, it is sufficient to perform a simulation by having an area of 2×2 km in every direction of the surroundings of the base station as the object because the radio waves are blocked by buildings. However, for performing an arithmetic calculation of the radio wave condition at an upper-floor of a high-rise building, it is necessary to expand the area of the simulation target to an area of about 10×10 km in every direction of the surroundings of the base station since there is less effect for blocking the radio waves. As described above, the arithmetic calculation processing amount increases in proportional to a square of the number of objects. Thus, assuming that the number of objects increases in proportional to expansion of the target area, the arithmetic calculation processing amount becomes increased by 625 times $(=((10\times10)/(2\times2))^2)$.

It is therefore an object of the present invention to improve the inconveniences of the techniques disclosed in each of Patent Documents described above, and to provide a radio wave propagation characteristic estimation system, a radio wave propagation characteristic estimation method, and a radio wave propagation characteristic estimation program, which are capable of executing estimation of the radio wave propagation characteristic at a high speed without deteriorating the accuracy.

Means for Solving the Problems

In order to achieve the foregoing object, the radio wave propagation characteristic estimation system according to the present invention is a system including a radio wave propagation path calculation module which calculates a propagation path of a radio wave emitted from a transmission point and reaching an observation point based on location data of the transmission point and the observation point set in advance and a radio wave propagation characteristic estimation module which estimates a propagation characteristic of the radio wave arriving at the observation point based on the calculated radio wave propagation path, and the system is characterized to include: a map data memory unit which stores map data containing structure data which shows locations and stereoscopic shapes of structures existing within peripheral areas of the transmission point and the observation point; and an object selection module which reads out the map data from the map data memory unit, and selects a part of the structures according to a height thereof from the structures shown in the structure data, wherein the radio wave propagation path calculation module searches the path of the radio wave emitted from the transmission point based on the structure data regarding the structure selected by the object selection module, and calculates the propagation path through which the radio wave reaches the observation point.

Further, the radio wave propagation characteristic estimation method according to the present invention is a method for estimating a propagation characteristic of a radio wave emitted from a transmission point and reaching an observation point based on map data containing structure data which shows locations and stereoscopic shapes of structures existing within peripheral areas of the transmission point and the observation point, and the method is characterized to include: reading out the map data stored in advance in a map data memory unit by an object selection module, and selecting a part of the structures according to a height thereof from the structures shown in the structure data contained in the map data; searching, by a radio wave propagation path calculation module, a path of the radio wave emitted from the transmission point based on the structure data regarding the selected structure and location data of the transmission point and the observation point, and calculating the propagation path through which the radio wave reaches the observation point; and estimating a propagation characteristic of the radio wave at the observation point by a radio wave propagation characteristic estimation module based on the calculated propagation path.

Furthermore, the radio wave propagation characteristic estimation program according to the present invention is a program which is characterized to cause a computer to execute: an object selecting function which inputs map data containing structure data which shows locations and stereoscopic shapes of structures existing within peripheral areas of a radio wave transmission point and an observation point, and selects a part of the structures according to a height thereof from the structures shown in the structure data; a radio wave propagation path calculating function which searches a path of the radio wave emitted from the transmission point based on the structure data regarding the selected structure and location data of the transmission point and the observation point, and calculates the propagation path through which the radio wave reaches the observation point; and a radio wave propagation characteristic estimation function which estimates a propagation characteristic of the radio wave at the observation point based on the calculated propagation path.

Effect of the Invention

The present invention is structured and functions as described above, so that it is possible to execute estimation of the radio wave propagation characteristic at a high speed without deteriorating the accuracy.

BRIEF DESCRIPTION OF THE DRAWINGS

FIG. 4 is a table showing an example of base station data held at a base station data memory unit according to the exemplary embodiment disclosed in FIG. 1;

BEST MODES FOR CARRYING OUT THE INVENTION

Figure 1:
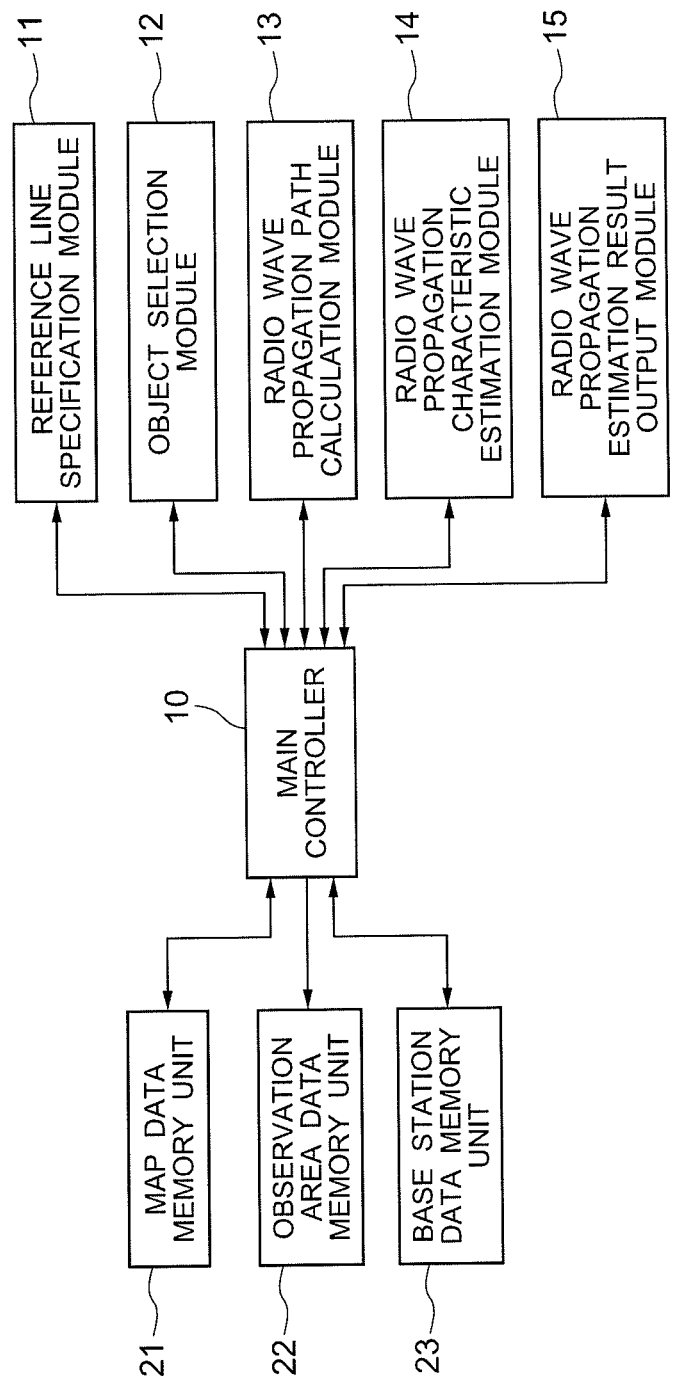
FIG. 1 is a functional block diagram showing the structure of a radio wave propagation characteristic estimation system of a first exemplary embodiment according to the invention.

An exemplary embodiment of the invention will be described hereinafter by referring to the drawings.
(First Exemplary Embodiment)

FIG. 1 is a functional block diagram showing the structure of a radio wave propagation characteristic estimation system of a first exemplary embodiment according to the present invention. The radio wave propagation characteristic estimation system according to the first exemplary embodiment includes: a base station data memory unit 23 which stores base station data regarding radio base stations; an observation area data memory unit 22 which stores location data of an observation area set as a location at which the propagation condition of radio waves emitted from the base station is observed; a radio wave propagation path calculation module 13 which calculates a propagation paths of radio waves emitted from the base station (transmission point) and reaching at the observation area based on the location data of the transmission point and the observation area; a radio wave propagation characteristic estimation module 14 which estimates the propagation characteristic of the radio waves in the observation area based on the calculated radio wave propagation paths; and a radio wave propagation estimation result output module 15 which outputs the radio wave propagation characteristic estimated by the radio wave propagation data estimation module 14.

Further, the radio wave propagation characteristic estimation system according to the first exemplary embodiment includes: a map data memory unit 21 which stores three-dimensional map data including structure data which shows locations and stereoscopic shapes of structures (objects) such as geographical features and natural features existing within peripheral areas of the base station (transmission point) and the observation area; and an object selection module 12 which reads out the map data and selects a part of the objects from the objects shown in the structure data according to the height thereof. The radio wave propagation path calculation module 13 includes a function which searches the path of the radio wave emitted from the transmission point based on the structure data of the object selected by the object selection module 12, and calculates the propagation path through which the radio wave reaches the observation area.

The radio wave propagation calculation module 13 is structured to trace the radio wave rays passing through the observation area since the location for observing the propagation condition of the radio waves emitted from the base station is defined as the three-dimensional area. However, the radio wave propagation calculation module 13 may be structured to calculate the propagation path through which the radio wave from the base station (transmission point) reaches the observation point by defining the location for observing the radio wave as an observation point that is a single point.

As shown in FIG. 1, the radio wave propagation characteristic estimation system according to the first exemplary embodiment further includes: a main controller 10 which controls operations of the entire system; and a reference line specification module 11 which sets a virtual reference line as a height reference of the objects required in the object selection module 12 based on the location data of the base station (transmission point). The object selection module 12 has a function which reads out the location data of a designated base station from the base station data memory unit 23, takes a surface acquired by rotating the virtual reference line about a straight line of an altitude direction containing the location of the base station as a reference surface, and selects the object whose height exceeds the reference surface from the objects shown in the structure data.

The map data memory unit 21 stores the three-dimensional map data including the structure data which shows a configuring surface of the structures (objects) such as geographical features and buildings existing within the peripheral areas of the base station and the observation area as coordinate data (latitude, longitude, altitude). The observation area data memory unit 22 stores coordinate data (latitude, longitude, altitude) that is location data of the observation area that is a target area for estimating the radio wave reception state. The base station data memory unit 23 stores location data (latitude, longitude, altitude) of the radio base station and the base station data showing the transmission power, the transmission frequency, and the like.

Figure 2:
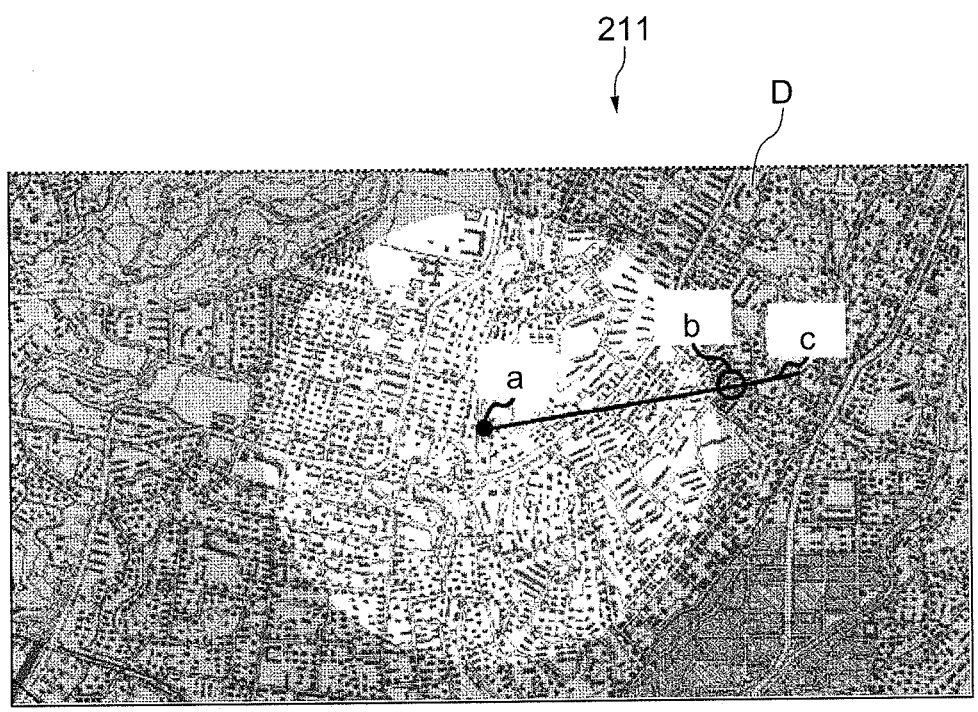
FIG. 2 is an illustration showing an image of an example of map data stored in a map data memory unit according to the exemplary embodiment disclosed in FIG. 1.

FIG. 2 is an illustration showing an image of an example of the three-dimensional map data stored in the map data memory unit 21. The image shown in FIG. 2 is a plan view of the map data 211 stored in the map data memory unit 21. As shown in FIG. 2, the map data memory unit 21 stores the three-dimensional map data 211 within a prescribed area, and the map data 211 contains structure data showing locations as well as shapes of the objects such as geographical features and buildings. For example, a triangular plane object may be formed from each altitude data of centers of grids by using 50 m mesh elevation data issued by the Geographical Survey Institute, the coordinate of the vertex of the plane object may be taken as the structure data regarding the geographical feature, and coordinates of vertexes of individual building polygons acquired from "Zmap Town 2" of ZENRIN Co. Ltd., for example, may be taken as the structure data.

Further, in FIG. 2, the location of a base station a selected from the base station data memory unit 23 as a radio wave transmission point and the location of an observation area b stored in the observation area data memory unit 22 are marked on the image of the map data 211, and a segment showing a surface c perpendicular to a level surface including the location of the base station and a representative location of the observation area b is written.

Figure 3:
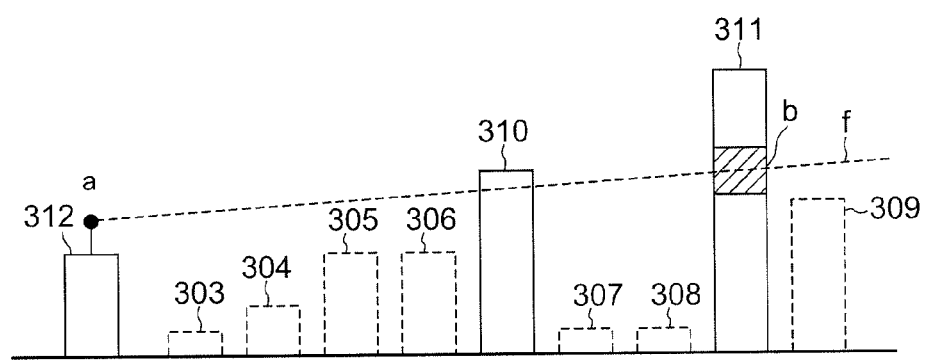
FIG. 3 is an illustration showing a sectional view of the image of the map data shown in FIG. 2.

FIG. 3 is a sectional view of the image of the map data 211 shown in FIG. 2, in which the surface c perpendicular to the level surface including the location of the base station and the representative location of the observation area b is taken as a cut face. Note here that the sectional view shown in FIG. 3 is simplified for the sake of explanations.

In the case shown in FIG. 3, the observation area b is set to be on an upper-floor of a building 311. In that case, the observation area data memory unit 22 may store the coordinate showing a boundary of the observation area b as the location data of the observation area or may store the coordinate of the center of a grid as the location data of the observation area, provided that the radio wave propagation is estimated on a discrete grid within the observation area b. While the observation area b is set to be within a single building in the illustration of FIG. 3, the observation area may be an area over a plurality of buildings or may be a wide areal range such as an area D (area on the outer side of a circle) shown in FIG. 2.

FIG. 4 is an illustration showing an example of the base station data stored in the base station data memory unit 23. As shown in FIG. 4, the base station data memory unit 23 stores the base station data in which location data (longitude, latitude, altitude) of the base stations (transmission points), transmission frequencies, transmission power capacitances, antenna heights, antenna patterns, antenna azimuth angles, and antenna tilt angles are stored by being corresponded to radio base station identifiers and radio cell identifiers.

The reference line specification module 11 has a function which inputs the location data of the designated base station stored in the base station data memory unit 23, and specifies a line towards the direction other than the altitude direction from a point on a straight line of the altitude direction including the location of the base station as a virtual reference line for selecting the building. The coordinate of the intersection between the virtual reference line and the straight line of the altitude direction including the location of the base station and the shape of the virtual reference line are set in advance depending on whether to place the importance on the accuracy or the speed of estimation of the radio wave propagation characteristic.

For example, when estimating the propagation characteristic of the radio wave transmitted from the base station a and reaching the observation area b as in the case shown in FIG. 3, a line f connecting the base station a and the observation area b may be specified as the virtual reference line. Further, a straight line of a specific altitude crossing with the straight line of the altitude direction including the coordinate of the location of the base station a may be specified as the virtual reference line. In the latter case, the altitude of the virtual reference line may be set to the altitude of the observation area b or may be set to the altitude of the base station a. The calculation time required for estimating the radio wave propagation characteristic and the accuracy of the estimation result may be adjusted by changing the altitude of the virtual reference line.

The object selection module 12 includes a function which defines a surface acquired by rotating the virtual reference line specified by the reference line specification module 11 about a vertical line including the designated base station (transmission point) as the reference surface, excludes the object of the altitude smaller than the reference surface to be out of the selection target from the buildings shown in the structure data, and selects the remaining objects. For example, in a case of estimating the propagation characteristic of the radio wave transmitted from the base station a and reaching the observation area b as shown in FIG. 3, coordinates (latitude, longitude, altitude) of each of the vertexes of buildings 303 to 311 are compared with a conical surface acquired by rotating the virtual reference line f as a generating line about the vertical line including the locational coordinate of the base station a, the buildings 310 and 311 having the altitude higher than the conical surface are selected, and the buildings 303 to 309 having the altitude lower than the conical surface are excluded.

The radio wave propagation path calculation module 13 has a function which searches the path of the radio wave emitted from the designated base station (transmission point) based on the structure data of the objects selected by the object selection module 12, and calculates the propagation path through which the radio wave reaches the observation area. The radio wave propagation path calculation module 13 searches points at which the radio wave emitted from the designated base station (transmission point) reacts by corresponding to the each object selected by the object selection module 12, and calculates the propagation path of the radio wave to the observation area (observation point). The point at which the radio wave reacts is a point at which the radio wave generates a physical phenomenon, e.g., a reflection point, a diffraction point, or a transmission point. The radio wave propagation path calculation module 13 is structured to search more than one physical phenomenon, and it is set in advance which of the physical phenomena to search. For example, the radio wave propagation path calculation module 13 may be set to search the three kinds such as the reflection point, the diffraction point, and the transmission point of the radio wave or may be set to search only one kind such as the reflection point or the diffraction point.

The radio wave propagation data estimation module 14 has a function which estimates the propagation characteristic of the radio wave in the observation area based on the propagation paths of each radio wave arrived at the observation area from the designated base station calculated by the radio wave propagation path calculation module 13. Specifically, the radio wave propagation data estimation module 14 calculates the propagation loss or delay expansion in the observation area based on the path lengths of the propagation paths of each radio wave arrived at the observation area (observation point) from the designated base station (transmission point), the transmission power, the frequency, and the like contained in the base station data regarding the base station.

The radio wave propagation estimation result output module 15 outputs the estimation result of the radio wave propagation characteristic acquired by the radio wave propagation data estimation module 14. For example, the grid within the observation area may be colored in colors according to the intensities of the electric fields of the radio waves from the designated base station and may be superimposed on a map to be displayed. Alternatively, numerical values showing the estimation result of the radio wave propagation characteristic at the evaluation target point within the observation area designated by the user may be displayed.

Note here that functional contents of the reference line specification module 11, the object selection module 12, the radio wave propagation path calculation module 13, the radio wave propagation characteristic estimation module 14, and the radio wave propagation estimation result output module 15 of the first exemplary embodiment may be put into programs to be executed by a computer.

As described, the radio wave propagation characteristic estimation system according to the first exemplary embodiment selects a part of the objects according to the geometrical relation between the location of the transmission point and the location of the observation area when estimating the propagation characteristic of the radio wave transmitted from the transmission point to the observation area within a space by considering the structures (objects) such as the buildings and geometrical features defined in the three-dimensional space, and estimates the radio wave propagation characteristic by considering only the selected object. Thus, it is possible to execute the estimation processing at a higher speed compared to the case where all the objects are taken into consideration.

Next, operations of the radio wave propagation characteristic estimation system according to the first exemplary embodiment will be described. Note here that the explanation of the operations hereinafter is an exemplary embodiment of a radio wave propagation characteristic estimation method of the present invention.

Figure 5:
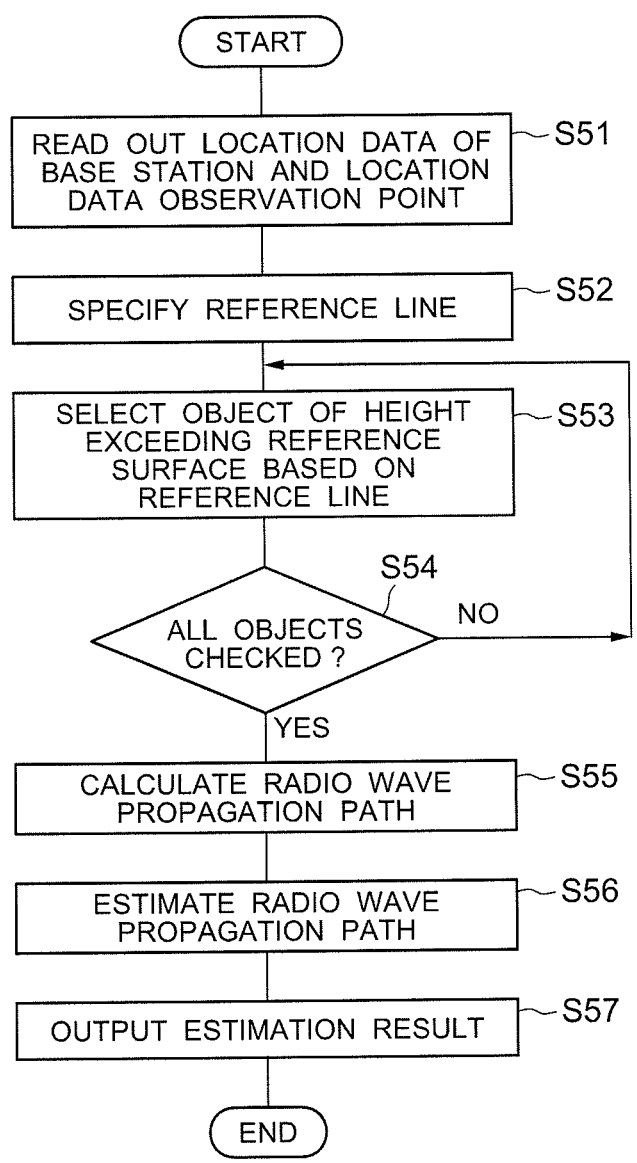
FIG. 5 is a flowchart showing an example of operations of the radio wave propagation characteristic estimation system according to the exemplary embodiment disclosed in FIG. 1.

FIG. 5 is a flowchart showing an example of the operations of the radio wave propagation characteristic estimation system according to the first exemplary embodiment. In the first exemplary embodiment, first, the reference line specification module 11 reads out the location data of the observation area stored in the observation area data memory unit 22 and the location data of the designated base station stored in the base station data memory unit 23 (step S51 of FIG. 5), and specifies the reference altitude based on at least one selected from the altitude of the base station and the altitude of the observation area (step S52 of FIG. 5). For example, a straight line connecting the location of the designated base station (transmission point) and the location of the observation area (observation point) is calculated, a conical surface acquired by rotating the straight line by having the vertical line including the location of the base station as the center of axis is calculated, and each altitude of the conical surface is set as a reference altitude.

Subsequently, the object selection module 12 selects the object whose altitude is equal to or higher than the reference altitude from the objects of the structure data contained in the three-dimensional map data stored in the map data memory unit 21 (step S53 of FIG. 5). That is, the object having the altitude lower than the reference altitude is excluded from the selection target, and only the structure data regarding the remaining objects is selected. Then, the object selection module 12 checks all the objects contained in the map data.

Subsequently, the radio wave propagation path calculation module 13 searches the path of the radio wave emitted from the designated base station (transmission point) based on the structure data of the objects selected by the object selection module 12, and calculates the propagation path through which the radio wave reaches the observation area (step S55 of FIG. 5).

The radio wave propagation data estimation module 14 estimates the propagation characteristic of the radio wave emitted from the designated base station (transmission point) in the observation area based on the propagation path calculated by the radio wave propagation path calculation module 13 (step S56 of FIG. 5). Then, the radio wave propagation estimation result output module 15 outputs the estimation result acquired by the radio wave propagation data estimation module 14 (step S56 of FIG. 5).

As described, the radio wave propagation characteristic estimation system according to the first exemplary embodiment excludes the object lower than the reference from the objects shown in the map data used for estimation of the radio wave propagation characteristic, and estimates the radio wave propagation characteristic based on the map data from which a part of the objects is excluded. Thus, when estimating the radio wave propagation characteristic by setting the observation area within an upper-floor of a building, the objects of lower altitudes exhibiting less influence on estimation of the propagation characteristic can be excluded. Therefore, the propagation path calculation amount can be reduced effectively compared to the case of performing estimation with all the objects being remained, and the estimation of the radio wave propagation characteristic can be done at a high speed without deteriorating the accuracy. This makes it possible to perform estimation of the radio propagation characteristic in a higher-altitude area distant from the base station at a high speed and with high accuracy, which cannot be achieved within a real time conventionally.

(Second Exemplary Embodiment)

Next, a second exemplary embodiment of the invention will be described.

The radio wave propagation characteristic estimation system of the second exemplary embodiment is structured to estimate the distribution of the radio wave propagation characteristic in the entire peripheral area of a designated base station (transmission point). For example, in the case of the map data like the case shown in FIG. 2 and FIG. 3, the entire space area from the distant place of the base station a to areas of a ground height (ground surface) to a higher-altitude part is divided into a plurality of grid-like observation areas (observation points), the propagation characteristics of each observation area of the radio wave emitted from the designated base station are estimated, and the distribution of the propagation characteristics of the radio wave emitted from the designated base station in the entire space area is estimated based on the result thereof.

Figure 6:
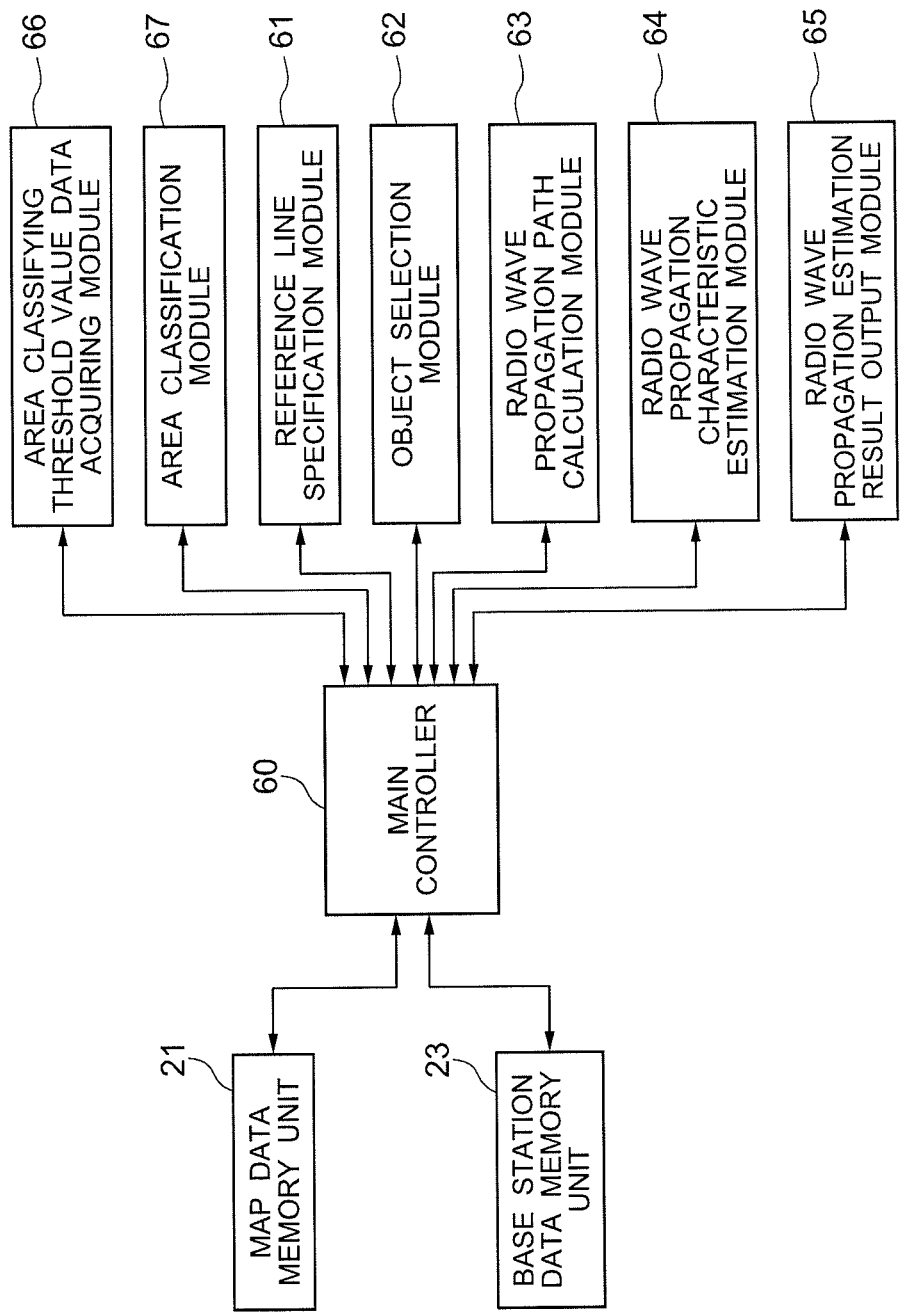
FIG. 6 is a functional block diagram showing the structure of a radio wave propagation characteristic estimation system of a second exemplary embodiment according to the invention.

FIG. 6 is a block diagram showing the structure of the radio wave propagation characteristic estimation system according to the second exemplary embodiment. In FIG. 6, same reference numerals as those of FIG. 1 are applied to the structural elements that have the same functions as the structural elements provided to the radio wave propagation characteristic estimation system of the first exemplary embodiment described above.

As shown in FIG. 6, the radio wave propagation characteristic estimation system of the second exemplary embodiment does not include a module for storing observation area data, since the entire area of the space area shown by the three-dimensional map data stored in the map data memory unit 21 is taken as the observation area. Further, the radio wave propagation characteristic estimation system of the second exemplary embodiment includes: an area classifying threshold value data acquiring module 66; an area classification module 67; a reference line specification module 61; an object selection module 62; a radio wave propagation path calculation module 63; a radio wave propagation characteristic estimation module 64; and a radio wave propagation estimation result output module 65.

The area classifying threshold value data acquiring module 66 acquires threshold value data for classifying the space area (peripheral area) shown by the three-dimensional map data stored in the map data memory unit 21 into a plurality of areas by an input from outside. This threshold value data is data for defining the boundary surface when dividing a space into a plurality of pieces. Examples thereof may be a value showing the distance from the designated base station shown in the base station data memory unit 23, a value showing an altitude above the sea level, or a value of the distance from the ground.

Figure 7:
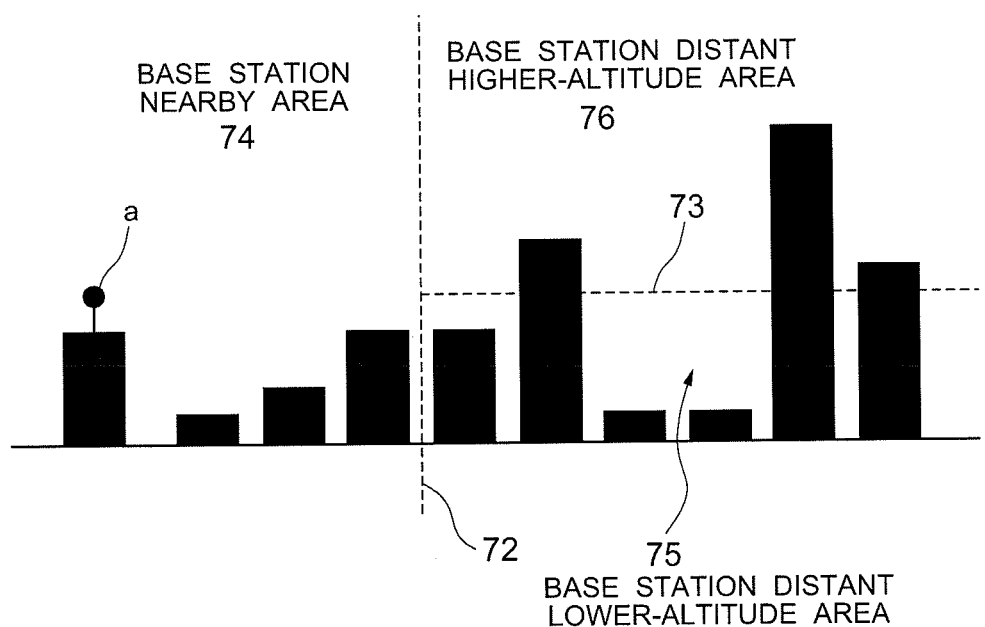
FIG. 7 is an explanatory illustration showing an example of a plurality of areas classified by an area classification module according to the exemplary embodiment disclosed in FIG. 6.

The area classification module 67 classifies the space area (peripheral area) shown by the three-dimensional map data stored in the map data memory unit 21 into a plurality of areas based on the threshold value data acquired by the area classifying threshold value data acquiring module 66. FIG. 7 is an illustration showing an image of an example of the three-dimensional map data stored in the map data memory unit 21, which is a sectional view including the location of the designated base station a. In the case shown in FIG. 7, a boundary surface 72 based on the threshold value data in the horizontal direction shown by the distance from the base station a and a boundary surface 73 based on the threshold value data in the vertical direction shown by the altitude from the sea level are set.

In the case shown in FIG. 7, it is so defined that: an area whose distance from the base station a is equal to or less than the horizontal-direction threshold value data (an area on the base station a side from the boundary surface 72) is a base station nearby area 74; an area whose distance from the base station a is over the horizontal-direction threshold value data and whose altitude is equal to or less than the vertical-direction threshold value data (an area on the lower-altitude side than the boundary surface 73 within the area on the opposite side of the base station a with respect to the boundary surface 72) is a base station distant lower-altitude area 75; and an area whose distance from the base station a is over the horizontal-direction threshold value data and whose altitude is over the vertical-direction threshold value data (an area on the higher-altitude side than the boundary surface 73 within the area on the opposite side of the base station a with respect to the boundary surface 72) is a base station distant higher-altitude area 76.

The reference line specification module 61 has a function which sets a virtual reference line based on at least either the altitude of the designated base station stored in the base station data memory unit 23 or the altitude of the observation area. The reference line specification module 61 according to the second exemplary embodiment may be structured to set the virtual reference line, when the observation area is at a location that exceeds the threshold value data acquired by the area classifying threshold value data acquiring module 66.

The object selection module 62 refers to the map data, and selects the objects used for estimating the radio wave propagation characteristic within the area by each of the plurality of areas acquired by being classified by the area classification module 67. For example, in the case shown in FIG. 7, when the observation area is in the base station nearby area 74, only the object within the base station nearby area 74 is selected. When the observation area is in the base station distant lower-altitude area 75, all the objects are selected. When the observation area is in the base station distant higher-altitude area 76, the object having the height that exceeds the reference surface based on the virtual reference line set by the reference line specification module 61 is selected.

The radio wave propagation path calculation module 63 searches the path of the radio wave emitted from the designated base station (transmission point) based on the structure data regarding the object selected by the object selection module 12, and calculates the propagation path through which the radio wave reaches the observation area.

The radio wave propagation characteristic estimation module 64 performs estimation of the radio wave propagation characteristic in the observation area based on the radio wave propagation path calculated by the radio wave propagation path calculation module 63. The radio wave propagation characteristic estimation module 64 according to the second exemplary embodiment may have a function which changes the propagation characteristic estimation method depending on which area out of the plurality of areas acquired by classification done by the area classification module 67 the observation area is set.

For example, in the case shown in FIG. 7, when the observation area is in the base station nearby area 74 or the base station distant higher-altitude area 76, estimation is performed based on the radio wave propagation path calculated by the radio wave propagation path calculation module 63, i.e., estimation using a tracing method, since there is a large local radio wave fluctuation caused by the peripheral objects. In the meantime, when the observation area is in the base station distant lower-altitude area 75, estimation using a statistical method is performed since a statistical multiple effect by a great number of objects can be obtained. The radio wave propagation estimation result output module 65 outputs the estimation result acquired by the radio wave propagation characteristic estimation module 64.

In a case where it is so structured that the object selection module 62 selects all the objects when the observation area is in the base station distant lower-altitude area 75 and the radio wave propagation characteristic estimation module 64 estimates the propagation by using the statistical method, the map data memory unit 21 may store the map data (statistical map data) required for employing the statistical method and the object selection module 12 may have a function which selects the statistical map data. The statistical map data specifically includes values such as a building occupying area rate and an average building height.

Further, in the case shown in FIG. 7 described above, the area classification module 67 classifies the space area into three areas of the base station nearby area 74, the base station distant lower-altitude area 75, and the base station distant higher-altitude area 76. However, the present invention is not limited only to such case. It is possible to classify the space area into three areas such as a higher-altitude area which is an area whose altitude exceeds the horizontal-direction threshold value data regardless of the distance from the base station a, a base station nearby lower-altitude area which is an area whose altitude is equal to or less than the horizontal-direction threshold value data and whose distance from the base station a is equal to or less than the vertical-direction threshold value data, and a base station distant lower-altitude area which is an area exceeding the vertical-direction threshold value data. In that case, the object selection module 62 selects a structure having a height that exceeds the reference surface from the structures shown in the structure data, when the observation area is in the higher-altitude area.

Note here that the functional contents of the reference line specification module 61, the object selection module 62, the radio wave propagation path calculation module 63, the radio wave propagation characteristic estimation module 64, the radio wave propagation estimation result output module 65, the area classifying threshold value data acquiring module 66, and the area classification module 67 of the second exemplary embodiment may be put into programs to be executed by a computer.

Next, operations of the radio wave propagation characteristic estimation system according to the second exemplary embodiment will be described. Note here that the explanation of the operations hereinafter is an exemplary embodiment of a radio wave propagation characteristic estimation method of the present invention.

Figure 8:
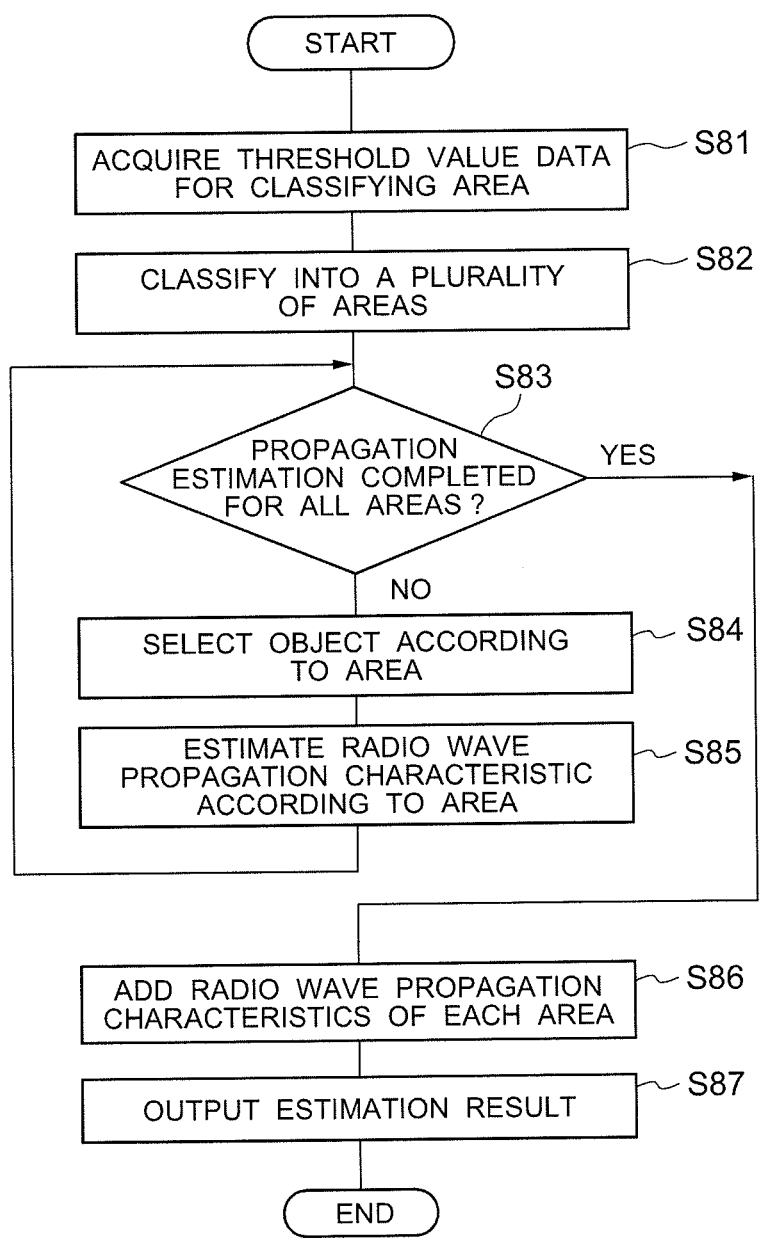
FIG. 8 is a flowchart showing an example of operations of the radio wave propagation characteristic estimation system according to the exemplary embodiment disclosed in FIG. 6.

FIG. 8 is a flowchart showing the operations of the radio wave propagation characteristic estimation system according to the second exemplary embodiment. In the second exemplary embodiment, first, the area classifying threshold value data acquiring module 66 acquires the threshold value data for classifying the area shown in the map data into a plurality of areas (step S81 of FIG. 8). The area classification module 67 classifies the space area shown in the map data into a plurality of areas based on the acquired threshold value data (step S82 of FIG. 8).

Subsequently, the radio wave propagation characteristic estimation module 64 judges whether or not the radio wave propagation estimation processing has been completed for all the areas acquired by the classification (step S83 of FIG. 8). When there are still areas on which the radio wave propagation estimation processing has not been completed, one of those areas is extracted. The object selection module 62 selects the object required for performing the radio wave propagation estimation according to the extracted area (step S84 of FIG. 8). Then, the radio wave propagation data estimation module 64 performs estimation of the radio wave propagation characteristic by using the method according to the area based on the data of the selected object (step S85 of FIG. 8).

In the meantime, when the radio wave propagation estimation processing has been completed for all the areas, the radio wave propagation estimation result output module 65 adds the estimation results of the plurality of classified areas (step S86 of FIG. 8), and outputs the added estimation result (step S87 of FIG. 8).

While the area classifying threshold value data acquiring module 66 of the second exemplary embodiment is structured to acquire the threshold value data for classifying the area shown in the map data into a plurality of areas by an input from outside, the present invention is not limited only to such case. The area classifying threshold value data acquiring module 66 may be structured to calculate threshold value data based on a condition of a radio wave propagation analysis. This allows the user to avoid a troublesome work of inputting the threshold value data. For example, for the method to calculate the horizontal-direction threshold value data (data defining the boundary surface 72) and the vertical-direction threshold value data (data defining the boundary surface 73), one of two methods described hereinafter may be used.

The first method is a method which determines the threshold value based on an applicable range of a statistical method, when it is set to use the statistical method at the time of estimating the radio wave propagation for the base station distant lower-altitude area 75. For example, in a case where the radio wave propagation characteristic estimation module 64 is structured to use "Okumura-Hata model" at the time of performing the radio wave propagation estimation for the base station distant lower-altitude area 75, the horizontal-direction threshold value data is calculated as 1 km since the lower limit of the applicable range of "Okumura-Hata model" is 1 km and the vertical-direction threshold value data is calculated as 10 km since the upper limit of the mobile station antenna height of "Okumura-Hata model" is 10 km.

The second method is a method which determines the threshold value based on an estimated radio wave reaching range. For example, in a case where it is assumed that the propagation environment is urban districts and a device for receiving the radio wave in the observation area is a mobile telephone, the horizontal-direction threshold value data (the distance from the base station) is determined as 3 km, for example, since the distance the radio wave reaches from the base station on the ground level is about several km. As another case, when the location of the observation area is set at a place higher than the height of the surrounding buildings, the radio wave is expected to reach there even when the value thereof exceeds the horizontal-direction threshold value data. Thus, the average value of the altitudes of all the objects is calculated as the vertical-direction threshold value data. In the latter case, the system may be structured not to perform the radio wave propagation estimation for the area that is distant from the base station and is of the value lower than the vertical-direction threshold value data.

The operations of the radio wave propagation characteristic estimation system in that case will be described by referring to FIG. 9. First, the area classifying threshold value data acquiring module 66 calculates the threshold value data for classifying the area shown in the map data into a plurality of areas (step S91 of FIG. 9). The area classification module 67 classifies the space area shown in the map data into a plurality of areas based on the threshold value data (step S92 of FIG. 9). Subsequently, the radio wave propagation characteristic estimation module 64 judges whether or not the radio wave propagation estimation processing has been completed for all the areas acquired by the classification (step S93 of FIG. 9). When there are still areas on which the radio wave propagation estimation processing has not been completed, one of those areas is extracted.

Figure 9:
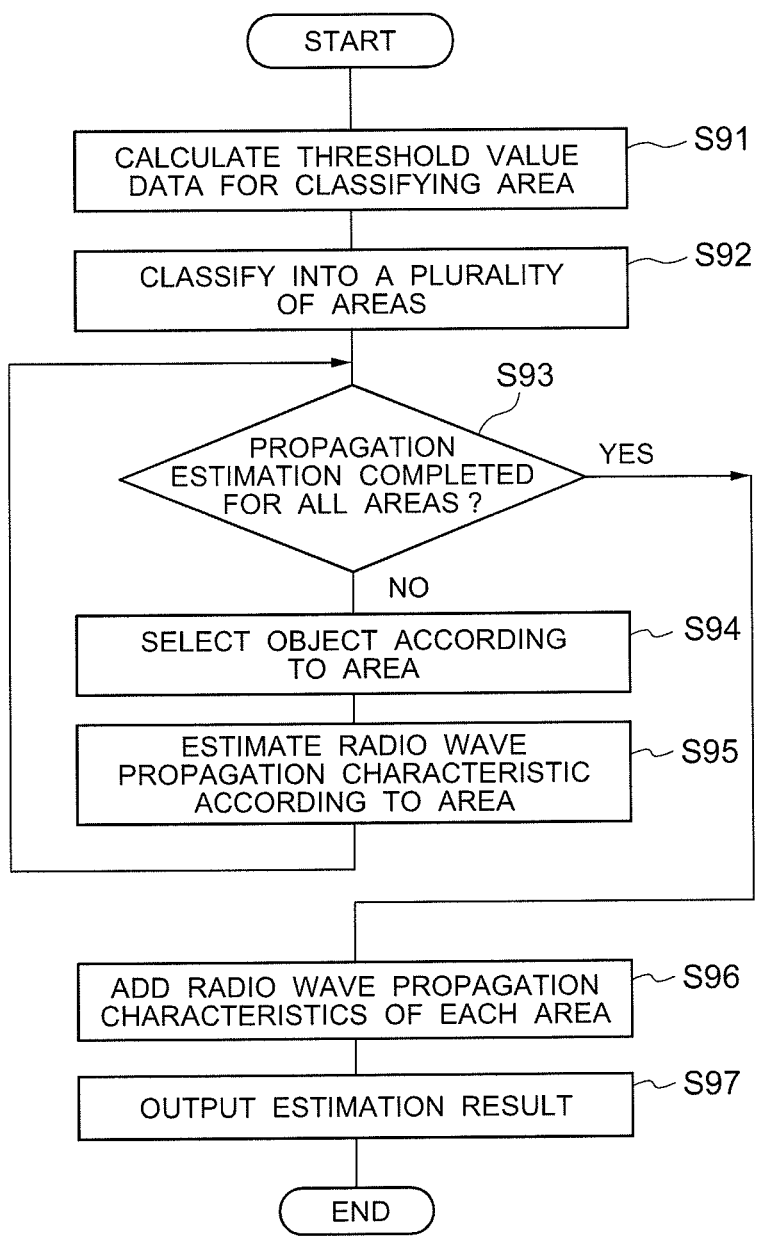
FIG. 9 is a flowchart showing another example of operations of the radio wave propagation characteristic estimation system according to the exemplary embodiment disclosed in FIG. 6.

The object selection module 62 selects the object required for performing the radio wave propagation estimation according to the extracted area (step S94 of FIG. 9). Then, the radio wave propagation data estimation module 64 performs estimation of the radio wave propagation characteristic based on the data of the selected object (step S95 of FIG. 9). In the meantime, when the radio wave propagation estimation processing has been completed for all the areas, the radio wave propagation estimation result output module 65 adds the estimation results of the plurality of classified areas (step S96 of FIG. 9), and outputs the added estimation result (step S97 of FIG. 9).

As described, the radio wave propagation characteristic estimation system according to the second exemplary embodiment is capable of classifying the space area on the map data of the periphery of the transmission point into a plurality of areas and estimating the radio wave propagation characteristic by using the optimum method for each area. As a result, the area distribution of the radio wave propagation characteristics can be estimated at a high speed without deteriorating the accuracy.

(Third Exemplary Embodiment)

Next, a third exemplary embodiment according to the invention will be described.

A radio wave propagation characteristic estimation system of the third exemplary embodiment includes: a radio wave propagation path calculation module which calculates a propagation path of a radio wave emitted from a transmission point and reaching an observation point based on location data of the transmission point and the observation point set in advance; a radio wave propagation characteristic estimation module which estimates a radio wave propagation characteristic at the observation point based on the calculated radio wave propagation path; a map data memory unit which stores map data containing structure data which shows locations and stereoscopic shapes of structures existing within peripheral areas of the transmission point and the observation point; and an object selection module which reads out the map data from the map data memory unit, and selects a part of the structures according the height thereof from the structures shown in the structure data contained therein.

The radio wave propagation path calculation module of the third exemplary embodiment has a function which searches the path of the radio wave emitted from the transmission point based on the structure data regarding the structure selected by the object selection module, and calculates the propagation path through which the radio wave reaches the observation point.

As operations of the radio wave propagation characteristic according to the third exemplary embodiment, first, the object selection module reads out the map data stored in advance to the map data memory unit, and selects a part of the structures according the height thereof from the structures shown in the structure data contained therein. The radio wave propagation path calculation module searches the path of the radio wave emitted from the transmission point based on the structure data regarding the selected structure based on the location data of the transmission point and the observation point, and calculates the propagation path through which the radio wave reaches the observation point. The radio wave propagation characteristic estimation module estimates the radio wave propagation characteristic at the observation point based on the calculated propagation path.

As described above, the radio wave propagation characteristic estimation system of the third exemplary embodiment is capable of performing calculation of the propagation path by excluding the structure of low height that is a structure whose influence upon the radio wave propagation characteristic at the observation point is small, when an upper-floor of a building is set as the observation point. Therefore, it is possible to execute the radio wave propagation characteristic estimation at a high speed without deteriorating the accuracy.

While the present invention has been described heretofore by referring to the embodiments (and EXAMPLES), the present invention is not limited only to the embodiments (and EXAMPLES). Various changes and modifications occurred to those skilled in the art can be applied to the structures and details of the present invention without departing from the scope of the present invention.

This Application claims the Priority right based on Japanese Patent Application No. 2009-022838 filed on Feb. 3, 2009 and the disclosure thereof is hereby incorporated by reference in its entirety.

INDUSTRIAL APPLICABILITY

The present invention is applicable to grasp the radio wave condition within a service area before placing a base station when designing a radio area of mobile communications, and to grasp an area having issues generated due to a weak wave and a radio wave interference under a current design of a base station so as to investigate a method for taking a proper countermeasure. In particular, the present invention can be applied to grasp an influence of the radio wave interference generated in an upper-floor of a building.

REFERENCE NUMERALS

10 Controller
11, 61 Reference line specification module
12, 62 Object selection module
13, 63 Radio wave propagation path calculation module
14, 64 Radio wave propagation characteristic estimation module
15, 65 Radio wave propagation estimation result output module
21 Map data memory unit
22 Observation area data memory unit
23 Base station data memory unit
66 Area classifying threshold value data acquiring module
67 Area classification module
a Base station (transmission point)
b Observation area (observation point)
c Cut surface
D Plan view of map data image
f Example of virtual reference line
303-312 Object (structure)
72 Surface based on horizontal-direction threshold value data
73 Surface based on vertical-direction threshold value data
74 Base station nearby area
75 Base station distant lower-altitude area
76 Base station distant higher-altitude area
211 Image of map data

The invention claimed is:

1. A radio wave propagation characteristic estimation system, comprising:
a map data memory unit which stores map data containing structure data which shows locations and stereoscopic shapes of structures existing within peripheral areas of a transmission point and an observation point;
a reference line specification module which specifies a reference altitude based on at least one of an altitude of the transmission point and an altitude of the observation point;
an object selection module which reads out the map data from the map data memory unit, and selects a structure of a height equal to or higher than the reference altitude from among the structures shown in the structure data contained in the map data for calculating a radio wave propagation path;
a radio wave propagation path calculation module which searches the path of the radio wave emitted from the transmission point based on the structure data regarding the structure selected by the object selection module, and calculates the propagation path through which the radio wave reaches the observation point; and
a radio wave propagation characteristic estimation module which estimates a propagation characteristic of the radio wave arriving at the observation point based on the calculated radio wave propagation path.

2. The radio wave propagation characteristic estimation system as claimed in claim 1, wherein:
the reference line specification module specifies a line connecting the transmission point and the observation point as a virtual reference line that is a judgment reference of the height of the structure selected by the object selection module; and
the object selection module takes a conical surface acquired by rotating the virtual reference line about a straight line of an altitude direction including the transmission point as a reference surface, and selects a structure of a height that exceeds the reference surface from among the structures shown in the structure data that is contained in the map data.

3. The radio wave propagation characteristic estimation system as claimed in claim 2, further comprising an area classification module which classifies the peripheral area shown in the map data into at least two areas according to the height of the structures.

4. The radio wave propagation characteristic estimation system as claimed in claim 3, wherein
the area classification module classifies the peripheral area shown in the map data into a nearby area from the transmission point, a distant lower-altitude area, and a distant higher-altitude area further according to the location data of the transmission point, wherein
the object selection module selects a structure of a height that exceeds the reference surface from among the structures shown in the structure data that is contained in the map data, when the observation point is in the distant higher-altitude area.

5. The radio wave propagation characteristic estimation system as claimed in claim 3, further comprising an area classification module which classifies the peripheral area shown in the map data into a higher-altitude area and a lower-altitude area according to the location data of the transmission point, wherein
the object selection module selects a structure of a height that exceeds the reference surface from among the structures shown in the structure data that is contained in the map data, when the observation point is in the higher-altitude area.

6. The radio wave propagation characteristic estimation system as claimed in claim 1, wherein
the reference line specification module takes a line of a specific altitude crossing with the straight line of the altitude direction as the virtual reference line instead of the line connecting the transmission point and the observation point.

7. A radio wave propagation characteristic estimation method comprising:
storing map data containing structure data which shows locations and stereoscopic shapes of structures existing within peripheral areas of a transmission point and an observation point;

specifying a reference altitude based on at least an one of altitude of the transmission point and an altitude of the observation point;

reading out the stored map data;

selecting a structure of a height equal to or higher than the reference altitude from among the structures shown in the structure data contained in the map data for calculating a radio wave propagation path;

searching a path of a radio wave emitted from the transmission point based on the structure data regarding the selected structure and location data of the transmission point and the observation point;

calculating the propagation path through which the radio wave reaches the observation point; and estimating a propagation characteristic of the radio wave at the observation point based on the calculated propagation path.

8. The radio wave propagation characteristic estimation method as claimed in claim 7 further comprising:

specifying a line connecting the transmission point and the observation point as a virtual reference line that is a height reference of the structure when the reference altitude is specified;

taking a conical surface acquired by rotating the virtual reference line about a straight line of an altitude direction including the transmission point as a reference surface; and selecting a structure of a height that exceeds the reference surface from among the structures shown in the structure data that is contained in the map data.

9. The radio wave propagation characteristic estimation method as claimed in claim 8, further comprising classifying the peripheral area shown in the map data into at least two areas according to the height of the structures.

10. The radio wave propagation characteristic estimation method as claimed in claim 9, wherein:

the peripheral area shown in the map data is classified into a nearby area from the transmission point, a distant lower-altitude area, and a distant higher-altitude area according to the location data of the transmission point; and selecting a structure of a height that exceeds the reference surface from among the structures shown in the structure data that is contained in the map data, when the observation point is in the distant higher-altitude area.

11. The radio wave propagation characteristic estimation method as claimed in claim 9, wherein:

the peripheral area shown in the map data is classified into a higher-altitude area and a lower-altitude area according to the location data of the transmission point; and selecting a structure of a height that exceeds the reference surface from among the structures shown in the structure data that is contained in the map data, when the observation point is in the higher-altitude area.

12. The radio wave propagation characteristic estimation method as claimed in claim 7 further comprising taking a line of a specific altitude crossing with the straight line of the altitude direction is taken as the virtual reference line.

13. A non-transitory computer readable recording medium storing a radio wave propagation characteristic estimation program which, when executed by a processor performs a method comprising:

storing map data containing structure data which shows locations and stereoscopic shapes of structures existing within peripheral areas of a transmission point and an observation point;

specifying a reference altitude based on at least an altitude of a radio wave transmission point or an altitude of an observation point;

reading out the stored map data;

selecting a structure of a height equal to or higher than the reference altitude from among the structures shown in the structure data that is contained in the map data for calculating a radio wave propagation path;

searching a path of the radio wave emitted from the transmission point based on the structure data regarding the selected structure and location data of the transmission point and the observation point;

calculating the propagation path through which the radio wave reaches the observation point; and estimating a propagation characteristic of the radio wave at the observation point based on the calculated propagation path.

14. The non-transitory computer readable recording medium storing the radio wave propagation characteristic estimation program as claimed in claim 13 further comprising:

specifying a line connecting the transmission point and the observation point as a virtual reference line that is a judgment reference of a height of the structure when the reference altitude is specified;

taking a surface acquired by rotating the virtual reference line about a straight line of an altitude direction including the transmission point as a reference surface; and selecting a structure of a height that exceeds the reference surface from among the structures shown in the structure data that is contained in the map data.

15. The non-transitory computer readable recording medium storing the radio wave propagation characteristic estimation program as claimed in claim 14, further comprising classifying the peripheral area shown in the map data into at least two areas according to the height of the structures.

16. The non-transitory computer readable recording medium storing the radio wave propagation characteristic estimation program as claimed in claim 15, wherein the peripheral area shown in the map data is classified into a lower-altitude area and a higher-altitude area according to the location data of the transmission point; and selecting a structure of a height that exceeds the reference surface from among the structures shown in the structure data that is contained in the map data, when the observation point is in the higher-altitude area.

17. The non-transitory computer readable recording medium storing the radio wave propagation characteristic estimation program as claimed in claim 15 wherein the peripheral area shown in the map data is classified into a nearby area from the transmission point, a distant lower-altitude area, and a distant higher-altitude area according to the location data of the transmission point; and selecting a structure of a height that exceeds the reference surface from among the structures shown in the structure data that is contained in the map data, when the observation point is in the distant higher-altitude area.

18. The non-transitory computer readable recording medium storing the radio wave propagation characteristic estimation program as claimed in claim 13 further comprising taking a line of a specific altitude crossing with the straight line of the altitude direction as the virtual reference line.

19. A radio wave propagation characteristic estimation system, comprising:

a map data memory means for storing map data containing structure data which shows locations and stereoscopic shapes of structures existing within peripheral areas of a transmission point and an observation point;

a reference line specification means for specifying a reference altitude based on at least one of an altitude of the transmission point and an altitude of the observation point;

an object selection means for reading out the map data from the map data memory means, and selecting a structure of a height equal to or higher than the reference altitude from among the structures shown in the structure data contained in the map data for calculating a radio wave propagation path;

a radio wave propagation path calculation means for searching the path of the radio wave emitted from the transmission point based on the structure data regarding the structure selected by the object selection means, and calculates the propagation path through which the radio wave reaches the observation point; and a radio wave propagation characteristic estimation means for estimating a propagation characteristic of the radio wave arriving at the observation point based on the calculated radio wave propagation path.

* * * * *